(No Model.)
W. S. ROGERS.
MOTION REVERSING DEVICE.
No. 597,435. Patented Jan. 18, 1898.
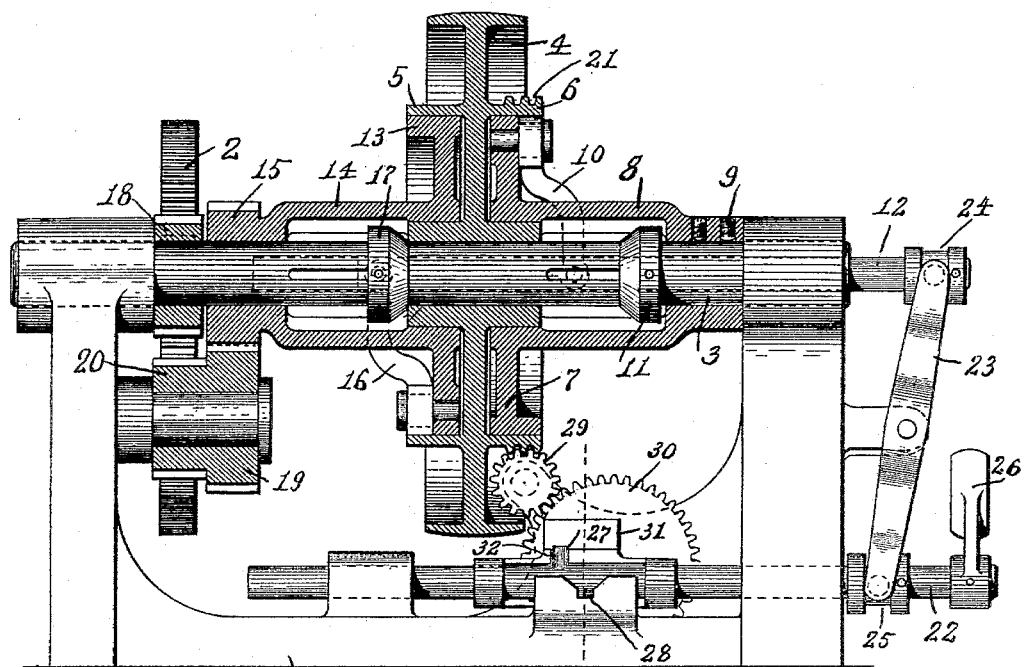
FIG. 1.
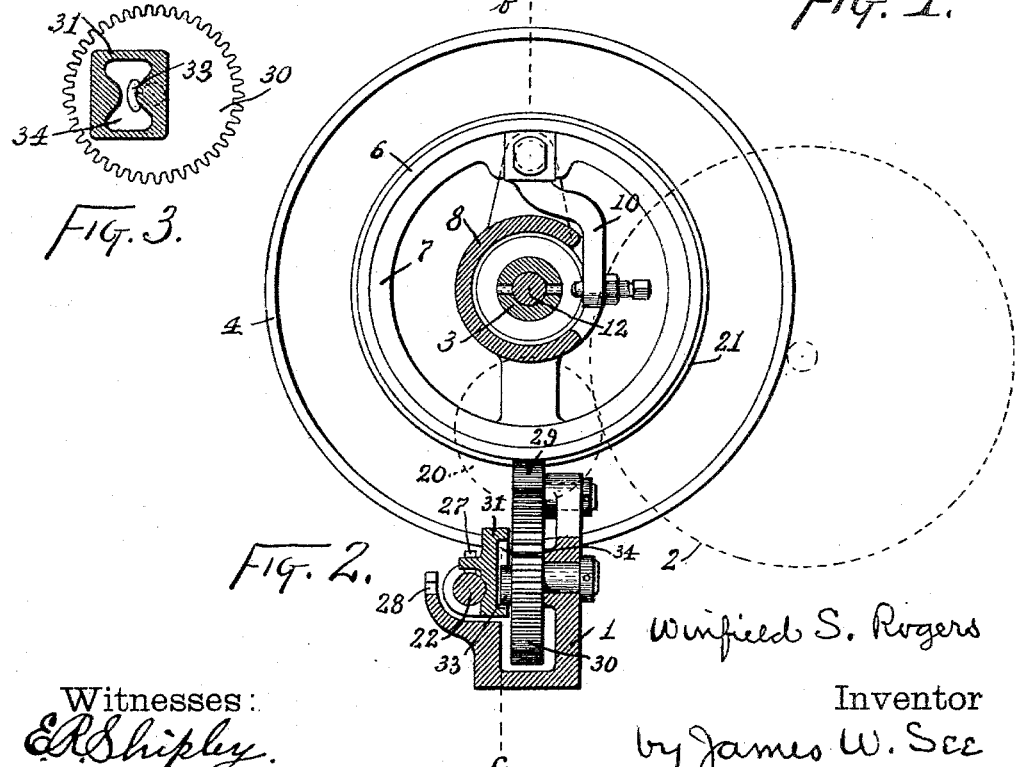
FIG. 3.
FIG. 2.
Witnesses:
E. R. Shipley.
K. W. Laurie.
Inventor
Winfield S. Rogers
by James W. See
Attorney

UNITED STATES PATENT OFFICE.

WINFIELD S. ROGERS, OF CINCINNATI, OHIO.

MOTION-REVERSING DEVICE.

SPECIFICATION forming part of Letters Patent No. 597,435, dated January 18, 1898.

Application filed September 10, 1897. Serial No. 651,178. (No model.)

*To all whom it may concern:*

Be it known that I, WINFIELD S. ROGERS, of Cincinnati, Hamilton county, Ohio, have invented certain new and useful Improvements in Motion-Reversing Devices, of which the following is a specification.

This invention pertains to improvements in devices for automatically reversing the direction of a machine part—for instance, the main wheel of a cylindrical washing-machine, which it is desired to have make a certain number of turns in one direction and then a similar number of turns in the reverse direction, and so on, the motion being derived from a part turning continuously in one direction.

My improvements will be readily understood from the following description, taken in connection with the accompanying drawings, in which—

Figure 1 is a vertical longitudinal section of a device exemplifying my invention, the section being in the plane of line *b* of Fig. 2; Fig. 2, a vertical transverse section of the same in the plane of line *a* of Fig. 1, and Fig. 3 a vertical longitudinal section of the reversing-cam in the plane of line *c* of Fig. 2.

In the drawings, 1 indicates fixed frame parts; 2, an exemplifying machine part whose direction of motion is to be automatically reversed, this part being shown as a toothed gear; 3, a shaft bored to permit the presence of a clutch-rod; 4, a pulley loose on shaft 3 and intended to receive the driving-belt and turn continuously in one direction; 5, a friction-rim fast on one side of this pulley; 6, a friction-rim fast on the opposite side of the pulley; 7, an open friction-ring adapted for expansive engagement with friction-rim 6, this friction-ring being carried by a hub mounted loosely on the appropriate side hub of pulley 4; 8, a long hollow hub projecting sidewise from friction-ring 7, this hub having a large port in its side; 9, set-screws securing hub 8 to shaft 3, whereby friction-ring 7 is unified with shaft 3; 10, the cam-lever, which serves in opening friction-ring 7 and expanding it within friction-rim 6, this cam-lever projecting tangentially across hub 8, so that its end is presented at the side port in the hub; 11, a cone sliding on shaft 3 within hollow hub 8 and adapted when sliding toward pulley 4 to engage cam-lever 10 and expand friction-ring 7; 12, a clutch-rod sliding in shaft 3 and connected with cone 11 by means of a cross-pin through a slot in the shaft, parts 6, 7, 10, 11, and 12 forming a well-known type of friction-clutch, the arrangement being obviously such that inward movement of rod 12 will cause the engagement of the clutch and the consequent locking of pulley 4 to shaft 3, movement of rod 12 to the right, to the position shown in Fig. 1, releasing the clutch and leaving the shaft free from the domination of the pulley; 13, a friction-ring similar to friction-ring 7, but coöperating with friction-rim 5; 14, the hollow hub of friction-ring 13; 15, a pinion fast with hub 14; 16, the cam-lever pertaining to friction-ring 13; 17, cone pertaining to cam-lever 16, this cone being also connected to clutch-rod 12, so that cones 11 and 17 move in unison, Fig. 1 showing clutch-rod 12 in its rightward position, corresponding with the expanded condition of friction-ring 13, under which conditions pulley 4 is locked to pinion 15; 18, a pinion fast on shaft 3 and engaging gear 2; 19, an idle-pinion engaging pinion 15; 20, a pinion fast with pinion 19 and engaging gear 2; 21, a worm-thread carried by pulley 4; 22, a rod mounted parallel with shaft 3 and capable of sliding motion and capable also of a motion of partial rotation; 23, a lever connecting rods 12 and 22 so that the two rods reciprocate simultaneously; 24, a grooved collar pinned on rod 12 and engaged by the upper end of lever 23; 25, a similar collar pinned on rod 22 and engaged by the lower end of the lever; 26, a weighted arm fast on rod 22; 27, a pin projecting from rod 22; 28, a notch in the fixed frame adapted to be engaged by pin 27 when rod 22 is properly moved, the position of this notch being such that when pin 27 engages it the rod 12 is at mid-stroke and both friction-clutches disengaged; 29, an idle-pinion engaging worm-thread 21; 30, an idle-gear driven by pinion 29; 31, a block sliding across the face of gear 30, this block having ears surrounding rod 22, so that the rod forms a guide to the block; 32, a notch in block 31, normally engaged by pin 27 and serving to lock the block to rod 22, so that the rod must reciprocate with the block; 33, a cam projecting from the face of gear 30 into a cam-shaped cavity in in block 31, and 34 the cam-shaped cavity in block 31 and engaged by cam 33, the form of the cam-cavity being obviously such that as gear 30 rotates block 31 will be reciprocated with considerable dwell at the end of each transaction.

Assume the parts as in Fig. 1, pulley 4 turning continuously. The left-hand clutch is engaged. Therefore the pulley causes the turning of pinion 15, and this pinion, through the medium of pinions 19 and 20, gives to gear 2 an appropriate direction of rotation. Pinion 18, being driven by gear 2, will cause shaft 3 to revolve in a direction opposite to that of pinion 15, and as the right-hand friction-clutch is in disengaged condition the shaft is at liberty to turn in such direction. The motion thus imparted to gear 2 will continue so long as the left-hand clutch is engaged, and that clutch will remain engaged so long as clutch-rod 12 occupies its rightward position. While pulley 4 is turning, its worm 21 causes the turning of gear 30, and in course of time the cam on that gear will become active and will quickly move rod 22 to the right, thus throwing rod 12 to the left and causing the left-hand friction-clutch to disengage and the right-hand friction-clutch to engage. Under these conditions shaft 3 will obviously turn with the pulley, and gear 2 will now be driven by pinion 18 and in a direction the reverse of that in which it previously turned. Such motion of gear 2 will continue so long as the right-hand friction-clutch is engaged, and this engagement will continue until the cam throws rod 12 again to the right. Thus gear 2 will be turned in one direction for a given length of time, after which it will turn in the opposite direction for the same length of time, and so on, the reversals of motion taking place at the ends of intervals whose lengths are measured by the number of teeth in cam-gear 30, each half-turn of cam-gear 30 representing one of the intervals between reversals, the relative speeds of rotation of gear 2 in its two directions of motion being controlled by the proportioning of pinions 15, 18, 19, and 20, the illustration showing such proportioning as will give to gear 2 the same rate of turning for each direction. Pin 27 normally locks cam-block 31 to rod 22. By partially turning cam-rod 22 by weighted handle 26 the pin becomes disengaged from the block and engages notch 28, under which condition both clutches are disengaged and gear 2 remains stationary, while pulley 4 continues to rotate.

An analysis of the system makes apparent the facts that an appropriately-driven toothed gear would be the equivalent of pulley 4; that a rack engaging pinions 18 and 20 would be the equivalent of gear 2; that belt-pulleys would be the equivalent of pinions 18 and 20 in transmitting motion to a part to be driven; that the friction-clutches illustrated are of well-known type, finding their equivalent in other well-known types of friction-clutches; that pinion 29 is a mere expedient for enabling gear 30 to be driven by a worm-thread somewhat covered by the rim of a pulley; that the rotary capacity of rod 22 is merely a convenience for entirely arresting the transmission effected by the system, and that rod 22 and lever 23 as separate adjuncts of clutch-rod 12 are simply expedients for permitting the general device to be constructed in short compact form, the sole office of gear 30 being to produce reciprocations on the part of rod 12.

I claim as my invention—

1. The combination, substantially as set forth, of a loose pulley, two machine parts to be rotated in alternation by said pulley, friction-clutches arranged to lock said pulley to said machine parts alternatively, a clutch-rod common to both clutches, and mechanism connecting the pulley and clutch-rod to cause the rotation of the pulley to reciprocate the clutch-rod at regular intervals.

2. The combination, substantially as set forth, of a shaft, a pulley loose thereon, a friction-clutch on one side of the pulley adapted to lock the pulley to the shaft, a pinion loose on the shaft and loose with reference to the pulley, a friction-clutch on the second side of the pulley adapted to lock the pulley to the pinion, and a clutch-rod common to both friction-clutches.

3. The combination, substantially as set forth, with a shaft, a pulley and pinion loose thereon, and two friction-clutches adapted to lock the pulley to the shaft and pinion alternatively, of a clutch-rod common to both friction-clutches, a worm turning with the pulley, a worm-gear driven by the worm, and a cam operated by the worm-gear and adapted to reciprocate the clutch-rod.

4. The combination, substantially as set forth, of a shaft, a pulley loose thereon and having a friction-rim, a friction-ring engaging said rim and having a ported hollow hub at one side of the pulley, a clutch-cone sliding on the shaft within said hollow hub, a lever carried by said friction-ring and presenting itself inwardly at said port, and a clutch-rod sliding axially in the shaft and connected with the cone.

5. The combination, substantially as set forth, with a loose pulley, a pair of friction-clutches, and a cam-block reciprocated by the pulley, of a rod adapted by reciprocations to lock the two clutches alternatively and arranged for motion of partial rotation, and a pin in said rod adapted to lock the rod to the cam-block and to a fixed part alternatively.

6. The combination, substantially as set forth, of a shaft, a pinion 18 fast thereon, a pulley loose on the shaft, a clutch to serve in locking the pulley to said pinion, a loose pinion 15 on the shaft, a clutch to serve in locking the pulley to said loose pinion, a first idle-pinion 20, a second idle-pinion 19 fast with the first idle-pinion, and a gear 2 engaging said fast pinion 18 and said first idle-pinion 20 and engaging said loose pinion.

7. The combination, substantially as set forth, with a shaft, a pulley loose thereon, two clutches, and a clutch-rod common to both clutches, of a worm-thread on the pulley, a pinion engaging said worm-thread, a cam-gear engaging said pinion, and a cam-block reciprocated by said cam-gear and connected with said clutch-rod.

WINFIELD S. ROGERS.

Witnesses:
CHARLES A. MINTEN,
WM. G. ROBERTS.